(12) United States Patent
Suarez et al.

(10) Patent No.: US 10,231,558 B1
(45) Date of Patent: Mar. 19, 2019

(54) FISHING REEL STORAGE AND DISPLAY SYSTEM

(71) Applicants: Omar F. Suarez, Cliffside Park, NJ (US); Justin Suarez, Cliffside Park, NJ (US)

(72) Inventors: Omar F. Suarez, Cliffside Park, NJ (US); Justin Suarez, Cliffside Park, NJ (US)

( * ) Notice: Subject to any disclaimer, the term of this patent is extended or adjusted under 35 U.S.C. 154(b) by 0 days.

(21) Appl. No.: 15/963,870

(22) Filed: Apr. 26, 2018

(51) Int. Cl.
| | |
|---|---|
| A47F 7/00 | (2006.01) |
| A47F 5/10 | (2006.01) |
| F16B 2/06 | (2006.01) |
| A01K 89/00 | (2006.01) |

(52) U.S. Cl.
CPC ............... *A47F 7/005* (2013.01); *A47F 5/10* (2013.01); *A01K 89/00* (2013.01); *F16B 2/065* (2013.01)

(58) Field of Classification Search
CPC . A47B 81/005; B62B 1/24; A45F 2200/0566; A47F 7/0028; A47F 7/005; A47F 5/10; F16B 2/065; A01K 89/00
See application file for complete search history.

(56) References Cited

U.S. PATENT DOCUMENTS

| | | | |
|---|---|---|---|
| 1,339,238 A | 5/1920 | Tillman | |
| 1,902,749 A | 3/1933 | Baird et al. | |
| 2,076,629 A | 4/1937 | Edwards | |
| 2,409,940 A | 10/1946 | Kay | |
| 2,583,831 A | 1/1952 | Goergen | |
| 2,601,959 A | 7/1952 | Busse | |
| 2,780,883 A | 2/1957 | Macy | |
| 2,814,147 A | 11/1957 | Henshaw | |
| 2,837,858 A | 6/1958 | Benson | |
| 3,074,198 A | 1/1963 | Bush | |
| 3,602,372 A | 8/1971 | Verrechio | |
| 3,958,694 A * | 5/1976 | Pritz | A47F 7/024 211/4 |
| 4,378,882 A * | 4/1983 | Miller | A01K 97/00 206/315.11 |
| 4,498,641 A * | 2/1985 | Steudle | B65H 49/38 206/315.11 |
| 4,775,260 A * | 10/1988 | Kecmer | F16B 2/14 361/801 |
| 4,784,554 A * | 11/1988 | Break | B25B 5/104 403/341 |

(Continued)

FOREIGN PATENT DOCUMENTS

GB 2221076 A * 1/1990 ........... A47F 5/0006

*Primary Examiner* — Ko H Chan
(74) *Attorney, Agent, or Firm* — Thomas J. Germinario (57) ABSTRACT

An apparatus for storing and/or displaying multiple fishing reels uses the reel foot of each reel to removably attach it to a reel rack. The reel rack has a generally rectangular oblong configuration. A rectangular rack base and two perpendicular, substantially rectangular rack sides define a longitudinal, axial rack channel. The reel foot of each fishing reel is removably attached to the reel rack by a pair of foot clamps. Each foot clamp has an open, generally rectangular or arcuate shape. The clamp arms are configured to slidably engage the rack sides, so that a pair of foot clamps can be cooperatively positioned to engage the two tapered ends of the reel foot of one of the fishing reels, thereby securing it to the reel rack for purposes of storage and/or display.

30 Claims, 9 Drawing Sheets

(56) References Cited

U.S. PATENT DOCUMENTS

| | | | | | |
|---|---|---|---|---|---|
| 4,789,286 | A | * | 12/1988 | Laput | F16B 7/044 |
| | | | | | 248/296.1 |
| 5,607,273 | A | * | 3/1997 | Kecmer | H05K 7/1404 |
| | | | | | 411/24 |
| 5,746,325 | A | * | 5/1998 | Lee | G11B 23/0236 |
| | | | | | 211/40 |
| 5,775,711 | A | * | 7/1998 | Floe | B62D 63/061 |
| | | | | | 280/149.2 |
| 5,787,630 | A | * | 8/1998 | Martel | F41G 11/003 |
| | | | | | 42/125 |
| 5,901,858 | A | * | 5/1999 | Perry | A47F 7/00 |
| | | | | | 211/13.1 |
| 5,967,467 | A | * | 10/1999 | Onishi | F16L 3/04 |
| | | | | | 248/223.41 |
| 7,752,800 | B2 | * | 7/2010 | Leyden | G08B 13/2402 |
| | | | | | 43/22 |
| 8,769,859 | B2 | * | 7/2014 | Li | F41G 11/003 |
| | | | | | 42/124 |
| 8,888,135 | B1 | * | 11/2014 | Reitnouer | B62D 21/11 |
| | | | | | 280/781 |
| 9,671,198 | B2 | * | 6/2017 | Bartoszewicz | F41G 11/003 |

\* cited by examiner

FISHING REEL STORAGE AND DISPLAY SYSTEM

FIELD OF INVENTION

The present invention pertains to the field of fishing equipment, and more particularly to systems for storing and displaying fishing equipment.

BACKGROUND OF THE INVENTION

A variety of different fishing reels of different sizes and configurations are used for different fishing environments and species. Storage and display of fishing reels for use and sale can be facilitated by a rack system to which the reels can readily be attached and removed. Since all fishing reels have reel foot which is inserted into the reel seat of a fishing rod, it makes sense to use the reel foot in connecting the reel to a storage/display rack. Since fishing reels have a range of widths, weights and separations between the reel foot and the reel itself, an effective rack system needs to be scalable to accommodate various types of reels. Moreover, the rack system should be adaptable for mounting in either a horizontal or a vertical orientation, depending on the configuration of the available support structures.

SUMMARY OF THE INVENTION

Note: As used in this specification and in the patent claims, the terms "downward," "lower" and "under" refer to the direction toward the rack base, while the terms "upward," "higher" and "above" refer to the direction away from the rack base. The term "proximal" refers to the direction toward the reel foot, while the term "distal" refers to the direction away from the reel foot.

The present invention is an apparatus for storing and/or displaying multiple fishing reels by using the reel foot of each reel to removably attach it to a reel rack. The reel rack has a generally rectangular, oblong configuration. A rectangular rack base and two perpendicular, substantially rectangular rack sides define a longitudinal, axial rack channel.

The reel foot of each fishing reel is removably attached to the reel rack by a foot clamp. Each foot clamp has an open, generally rectangular or arcuate shape, with an upper clamp face and two substantially perpendicular clamp arms projecting downward from the lateral edges of the clamp face. Projecting downward from the clamp face between the clamp arms is a medial plug, which is configured to slidably insert into the rack channel.

The clamp arms are configured to slidably engage the rack sides, so that a pair of foot clamps can be cooperatively positioned to engage the two tapered ends of the reel foot of one of the fishing reels, thereby securing it to the reel rack for purposes of storage and/or display.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
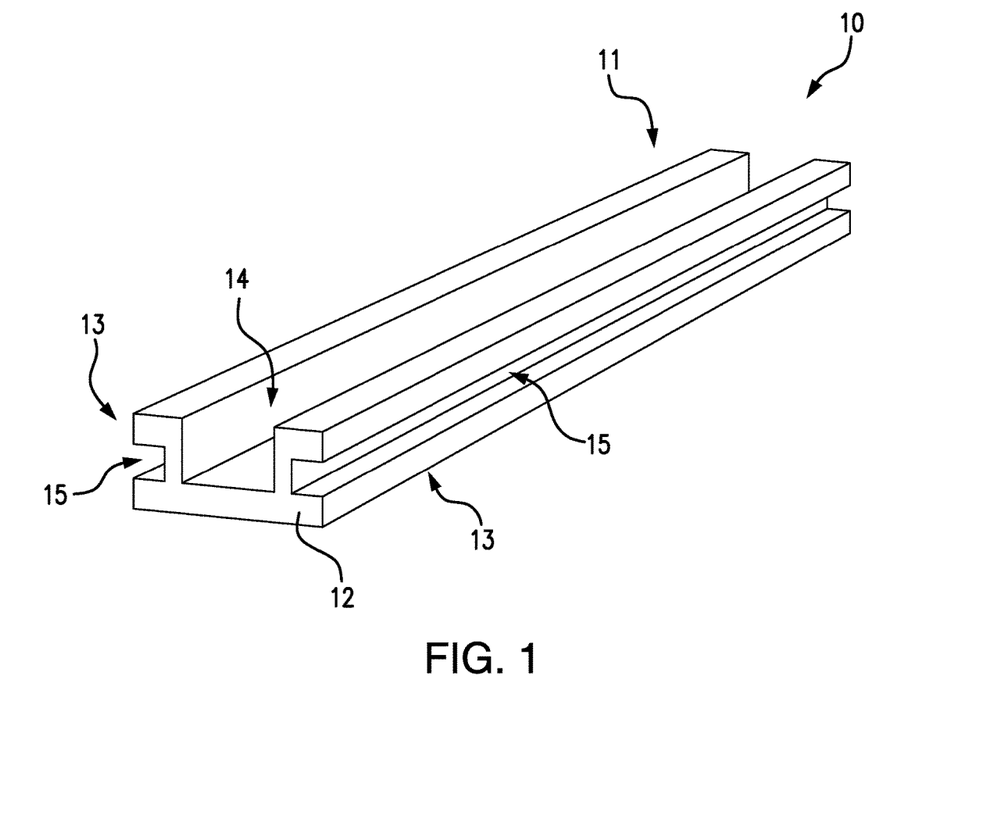
FIG. 1 is a perspective view of a reel rack according to one embodiment of the present invention.
Figure 2A:
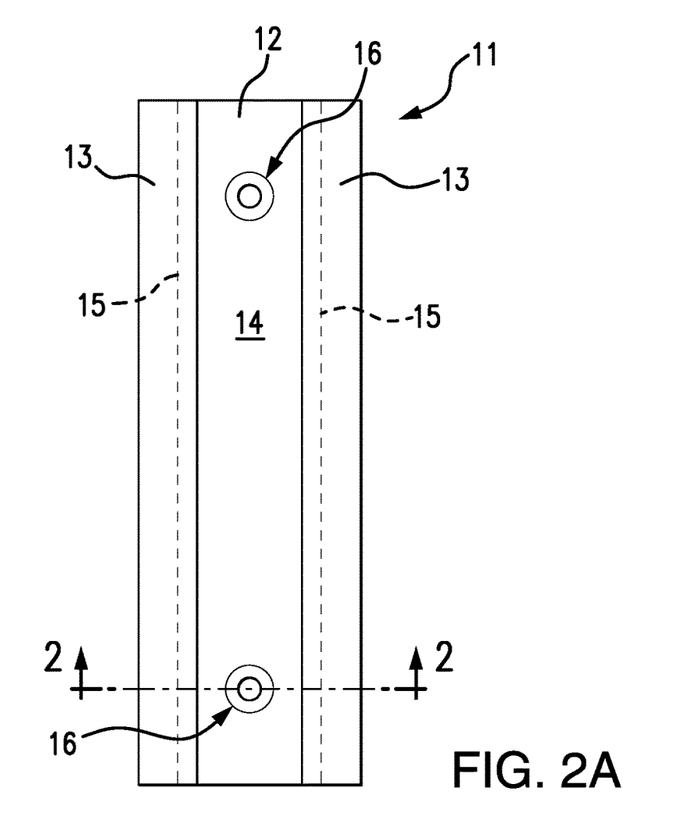
FIG. 2A is a plan view of a reel rack according to one embodiment of the present invention.
Figure 2B:
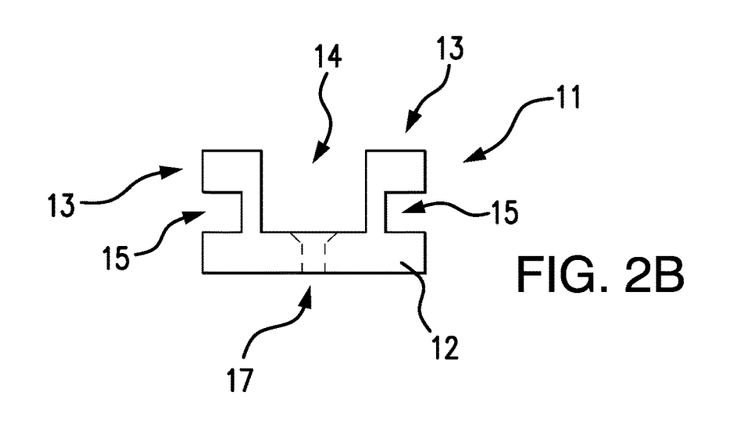
FIG. 2B is a cross-sectional view of the reel rack of FIG. 2A taken along the line 2-2.

Referring to FIGS. 1, 2A and 2B, an exemplary reel rack 11, according to one embodiment of the present invention 10, comprises a rectangular rack base 12 and two slotted rectangular rack sides 13, which together define a longitudinal, axial rack channel 14. Along the exterior side of each rack side is a longitudinal, axial side slot 15. In the rack base 12 are multiple rack attachment means 16, which in this embodiment comprise two countersunk screws 16 inserted through two conjugate screw apertures 17, by which the reel rack can be mounted either horizontally or vertically on a supporting structure, such as a wall. Alternative rack attachment means can be nails, bolts or rivets passing through the rack base 12 into a supporting structure.

Figure 3A:
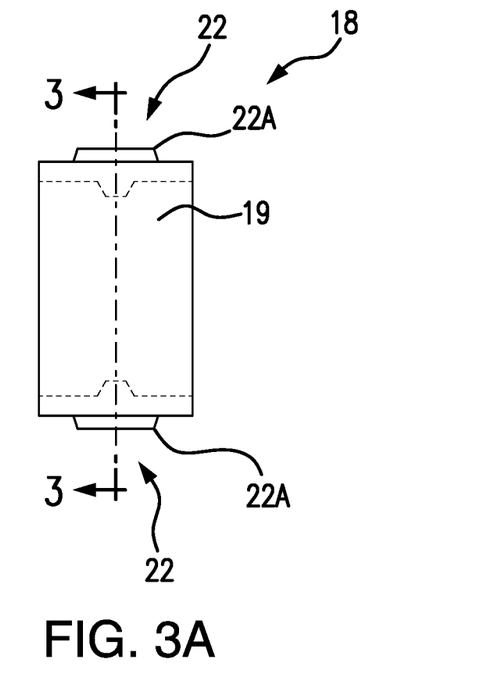
FIG. 3A is a plan view of a foot clamp according to one embodiment of the present invention.
Figure 3B:
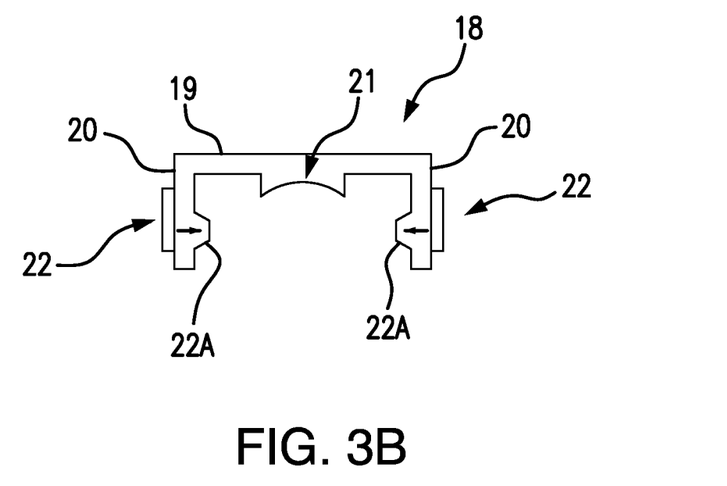
FIG. 3B is a cross-sectional view of the foot clamp of FIG. 3A taken along the line 3-3.

Referring to FIGS. 3A and 3B, one version of the foot clamp 18 comprises an upper, rectangular clamp face 19, two rectangular clamp arms 20, which project downward for the lateral edges of clamp face 19, and a medial plug 21, which projects downward from the middle of the clamp face 19. In this example, both clamp arms 20 have a clamp attachment means 22 consisting of a retractable, spring loaded, rotating can plunger 22A, which engages the rack sides 13 so as to secure the foot clamp 18 in a fixed position along the reel rack 11. The mechanism of the retractable, spring loaded, rotating can plunger 22A is that of the conventional retractable ball-point pen, as described in U.S. Pat. Nos. 3,944,371, 4,221,491 and 2,865,331, which are incorporated herein by reference.

Figure 5:
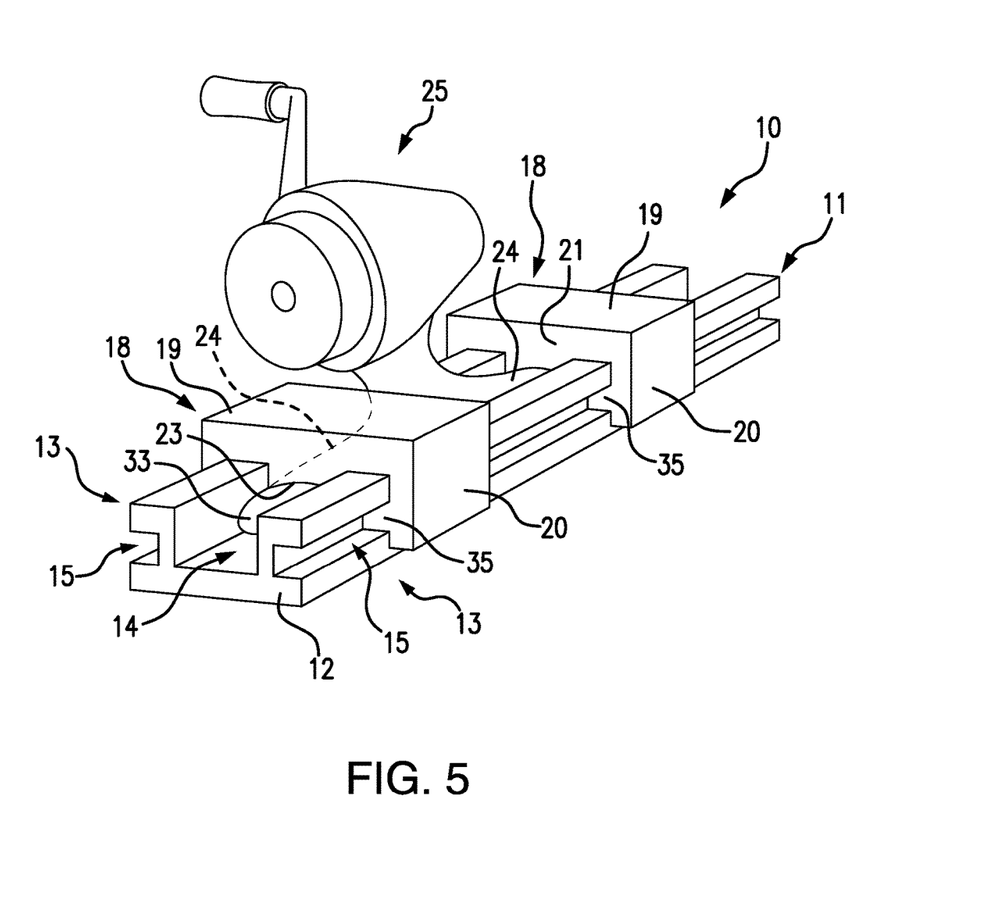
FIG. 5 is a perspective view of a fishing reel with its reel foot secured in the rack channel of a reel rack by a cooperating pair of foot clamps according to one embodiment of the present invention.

In this embodiment, the medial plug 21 has a concave lower plug surface 23, which conjugately conforms to the convex curvature of the reel foot 24 of one of the fishing reels 25, as best seen in FIG. 5. As shown in FIG. 5, each of the reel foot's tapered ends 33 is inserted into the rack channel 14 under the lower plug surface 23 of one the pair of foot clamps 18 in securing the fishing reel 25 to the reel rack 11.

Referring to FIGS. 4A-4D, another version of the foot clamp 18 has a foot cradle 26 attached to the upward side of the clamp face 19. The foot cradle 26 can be integral with the clamp face 19, or as in this example, the foot cradle 26 can be removably attached by means of a countersunk cradle screw 27 inserted through a cradle screw aperture 28 in the obverse side of the foot cradle 26. To prevent rotation of the detachable foot cradle 26, the reverse side of the foot cradle 26 has cradle ridges 29 which conjugately engage corresponding clamp notches 30 in the clamp face 19.

Figure 6:
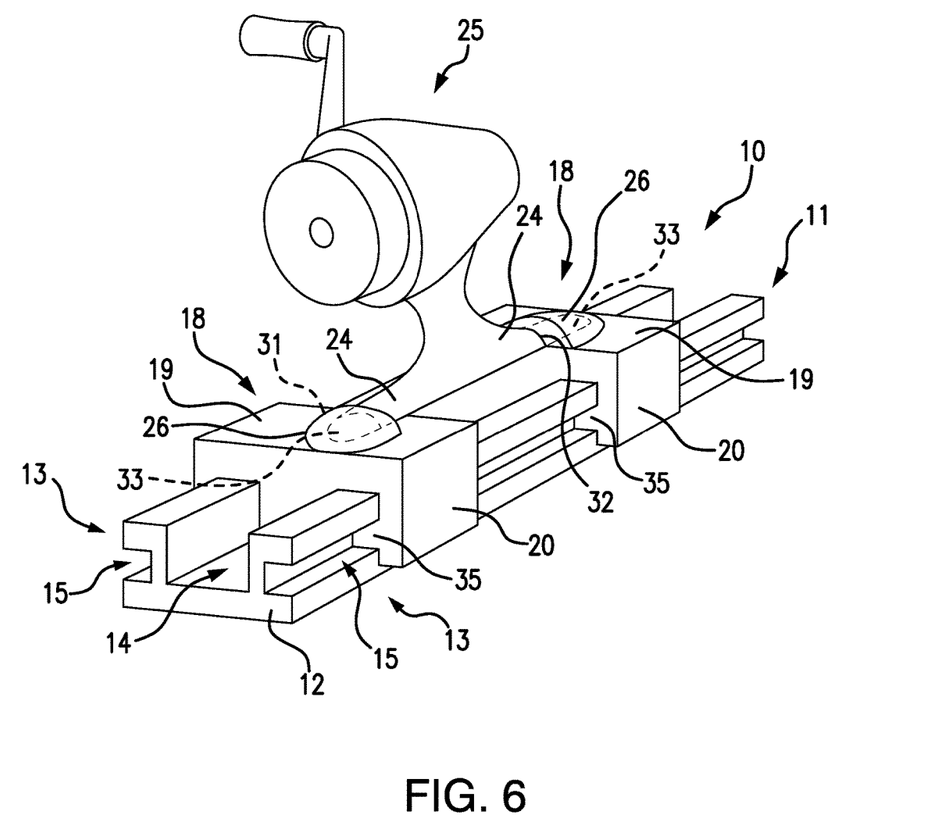
FIG. 6 is a perspective view of a fishing reel with two ends of its reel foot secured in the foot cradles of a cooperating pair of foot clamps according to one embodiment of the present invention.
Figure 8:
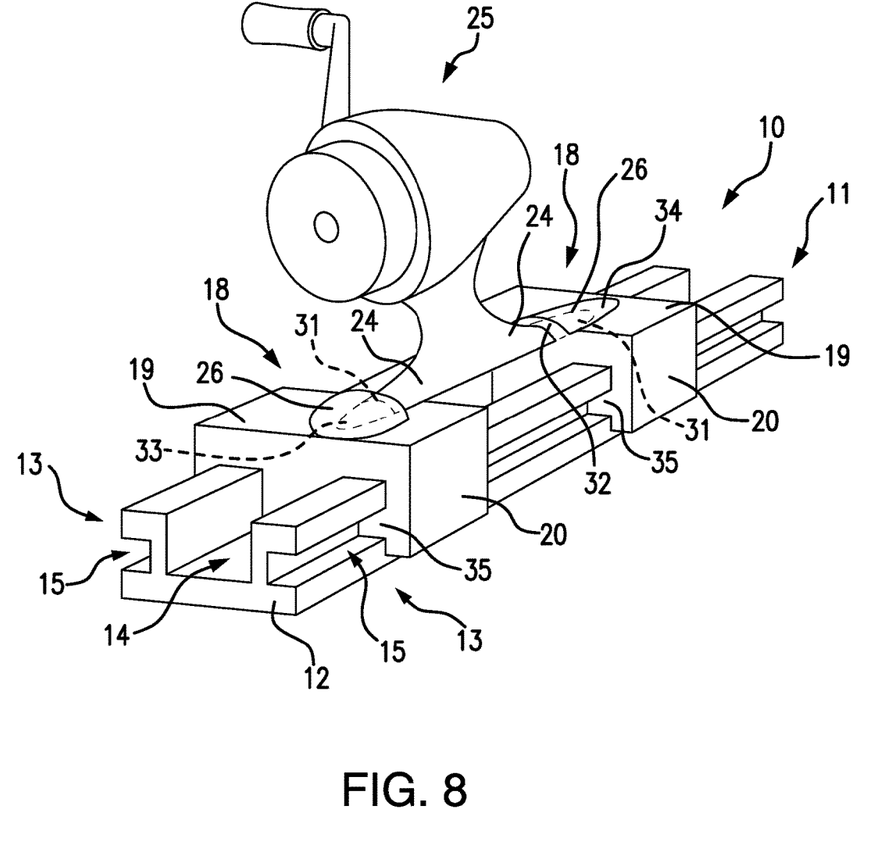
FIG. 8 is a perspective view of a fishing reel with two ends of its reel foot secured in the foot cradles of a cooperating pair of foot clamps according to one embodiment of the present invention.

As best seen in FIGS. 6 and 8, the foot cradle 26 has an internal cradle cavity 31 accessible through a cradle aperture 32 on the proximal side of the foot cradle 26. The cradle cavity 31 is tapered to conjugately conform to one of the tapered ends 33 of the reel foot 24 of one of the fishing reels 25. Each of the tapered ends 33 of the reel foot 24 is inserted into the cradle cavity 31 of one of the pair of foot clamps 18 in securing the fishing reel 25 to the reel rack 11. In cases where the structure of the fishing reel 25 interferes with the clamp attachment means 22, the foot cradle 18 has on its distal end a cradle extension plate 34 that connects it to the clamp face 19, as best seen in FIG. 8.

Figure 4A:
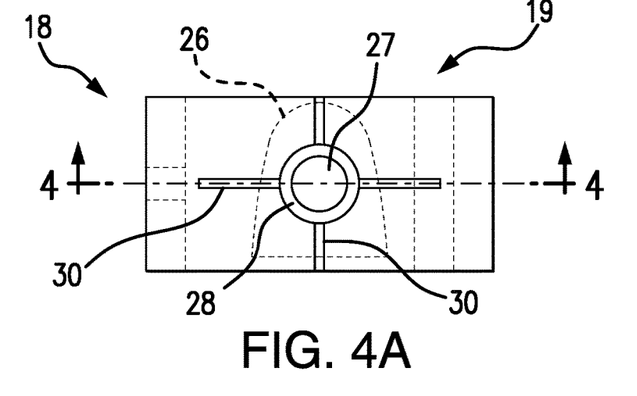
FIG. 4A is a plan view of a foot clamp according to one embodiment of the present invention.
Figure 4B:
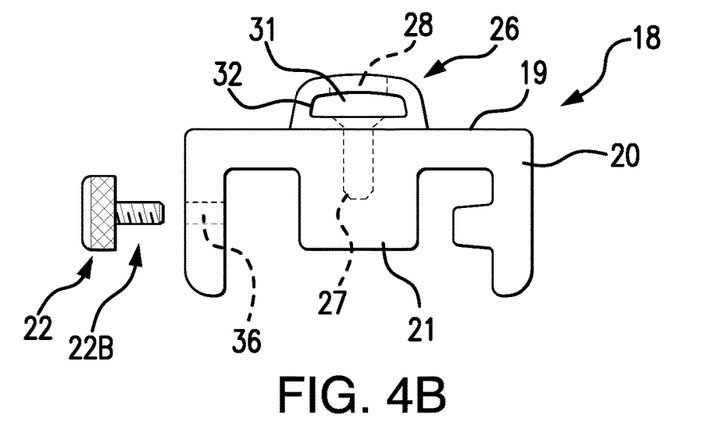
FIG. 4B is a cross-sectional view of the foot clamp of FIG. 4A taken along the line 4-4.
Figure 4C:
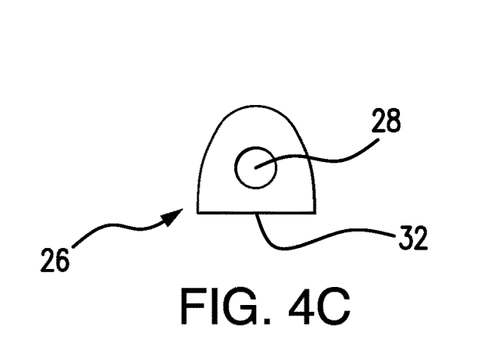
FIG. 4C is a detail plan obverse view of the foot cradle of the foot clamp shown in FIG. 4A.
Figure 4D:
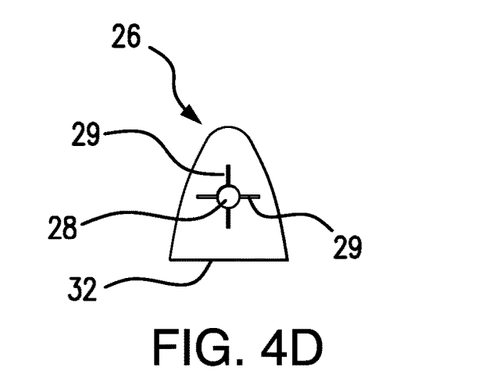
FIG. 4D is a detail plan reverse view of the foot cradle of the foot clamp shown in FIG. 4A.
Figure 7A:
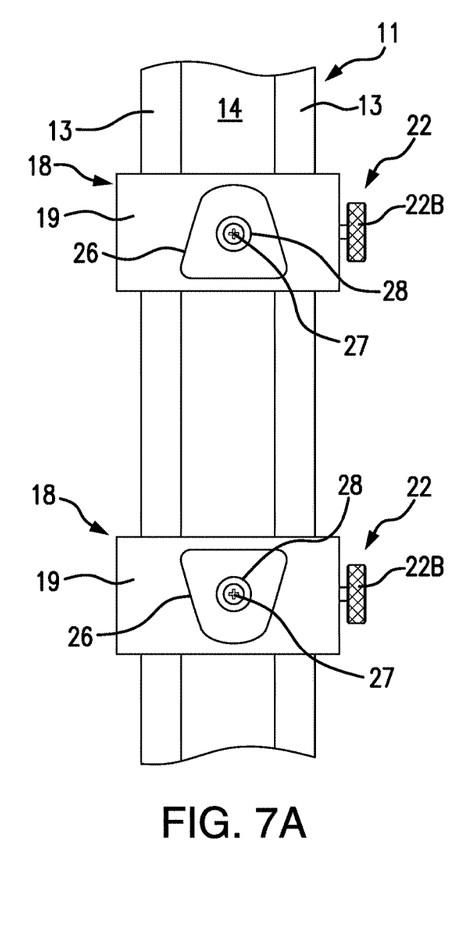
FIG. 7A is a plan view of a cooperating pair of foot clamps positioned on a reel rack according to one embodiment of the present invention.
Figure 7B:
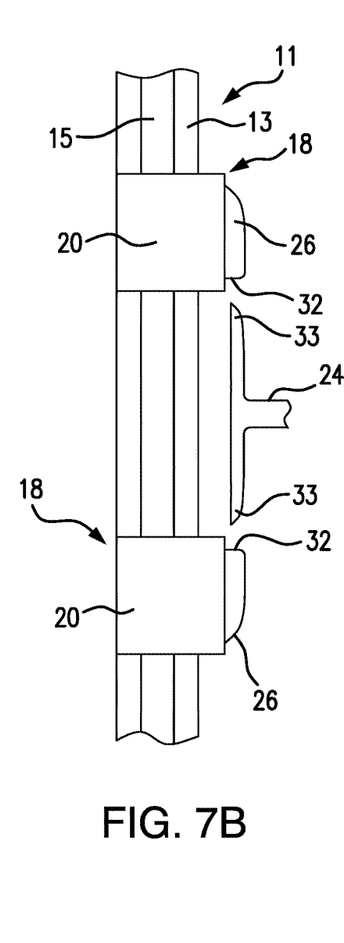
FIG. 7B is a left side profile view of the pair of foot clamp shown in FIG. 7A, with an exemplary reel foot positioned between them.
Figure 7C:
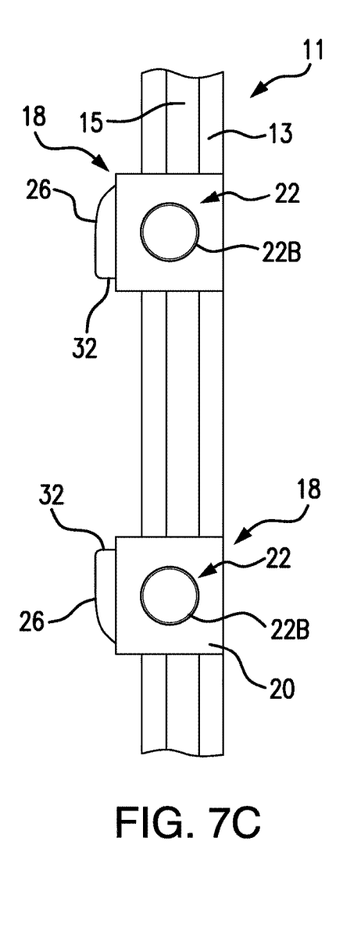
FIG. 7C is a right side profile view of the pair of foot clamps shown in FIG. 7A.

Referring again to FIG. 4B, this exemplary embodiment of the foot clamp 18 has, on the internal side of one of its clamp arms 20, an arm flange 35, which is configured to slidably and conjugately engage the side slot 15 of the reel rack 11, as best seen in FIGS. 5, 6 and 8. On the other clamp arm 20, this foot clamp has a clamp attachment means 22, consisting in this example of a thumb screw or set screw 22B with a cooperating threaded screw hole 36 through the clamp arm 20, by which the foot clamp 18 is secured in a fixed position on the reel rack 11, as depicted in FIGS. 7A-7C. As shown in FIG. 4B, this foot clamp 18 has a cuboidal medial plug 21 that slidably fits into the rack channel 14 so as to stabilize the seating of the foot clamp 18 therein.

Figure 9:
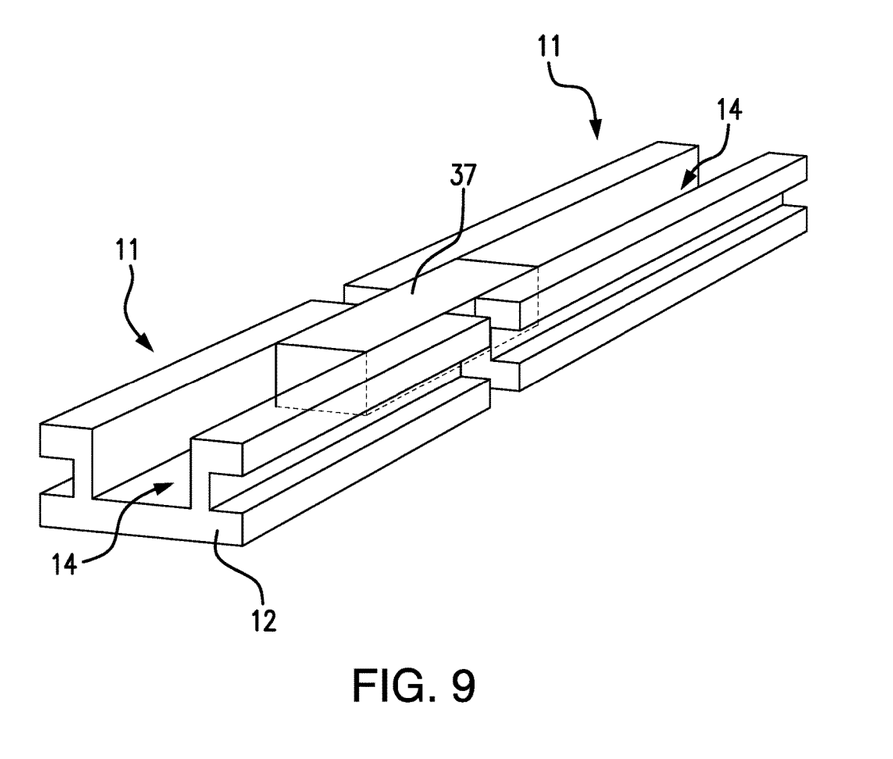
FIG. 9 is a perspective view of two reel racks interconnected by a rack bridge passing through their respective rack channels.

As depicted in FIG. 9, two reel racks 11 can be longitudinally interconnected across their adjacent ends by a rack bridge 37 passing through their respective rack channels 14. In this example, the rack bridge 37 is cuboidal, conforming to the shape of the rack channels 14.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. An apparatus for storing and displaying multiple fishing reels, each of which has a reel foot, the apparatus comprising:

an oblong reel rack, comprising an oblong rectangular rack base, two oblong rack sides, which extend substantially perpendicularly upward from two lateral edges of the rack base, and a longitudinally axial rack channel, which is defined by the rack base and the rack sides;

multiple open, generally rectangular or arcuate foot clamps, each foot clamp comprising a clamp face, two clamp arms, which extend substantially perpendicularly downward from two lateral sides of the clamp face, and a medial plug, which extends substantially perpendicularly downward from the clamp face and which is configured to slidably insert into the rack channel, wherein the clamp arms are configured to slidably engage the rack sides, and wherein each foot clamp is slidably moveable along the rack channel, and wherein a pair of foot clamps are cooperatively positioned to engage two tapered ends of the reel foot of one of the fishing reels, thereby securing the fishing reel to the reel rack for purposes of display and storage.

2. The apparatus according to claim 1, wherein one or both of the clamp arms has clamp attachment means by which the foot clamp can be secured to one or both of the rack sides.

3. The apparatus according to claim 2, wherein one or both of the rack sides has/have an exterior, longitudinally axial side slot, and wherein one or both of the clamp arms has/have an internal, substantially orthogonal arm flange configured to slidably and conjugately engage the side slot(s).

4. The apparatus according to claim 3, wherein the medial plug has a concave lower plug surface which conjugately conforms to a convex curvature of the reel foot of one of the fishing reels, and wherein each of the tapered ends of the reel foot is inserted into the rack channel under the lower plug surface of one of the pair of foot clamps in securing the fishing reel to the reel rack.

5. The apparatus according to claim 3, wherein each of the foot clamps further comprises a foot cradle, which has a proximal side and a distal side and which is upwardly attached to the clamp face, and which has an internal cradle cavity that is accessible through a cradle aperture on the proximal side of the foot cradle, and wherein the cradle cavity is tapered to conjugately conform to one of the tapered ends of the reel foot of one of the fishing reels, and wherein each of the tapered ends of the reel foot is inserted into the cradle cavity of one of the pair of foot clamps in securing the fishing reel to reel rack.

6. The apparatus according to claim 5, wherein the foot cradle is attached to the clamp face through a cradle extension plate extending from the distal side of the foot cradle, so as to avoid interference between the fishing reel and the clamp attachment means.

7. The apparatus according to claim 4, wherein one or both of the clamp attachment means comprises a thumbscrew or a setscrew that engages one of the rack sides through a threaded screw hole in one of the clamp arms.

8. The apparatus according to claim 4, wherein one or both of the clamp attachment means comprises a retractable, spring-loaded, rotating-cam plunger that engages one of the rack sides through a plunger hole in one of the clamp arms.

9. The apparatus according to claim 5, wherein one or both of the clamp attachment means comprises a thumbscrew or a setscrew that engages one of the rack sides through a threaded screw hole in one of the clamp arms.

10. The apparatus according to claim 6, wherein one or both of the clamp attachment means comprises a thumbscrew or a setscrew that engages one of the rack sides through a threaded screw hole in one of the clamp arms.

11. The apparatus according to claim 5, wherein one or both of the clamp attachment means comprises a retractable, spring-loaded, rotating-cam plunger that engages one of the rack sides through a plunger hole in one of the clamp arms.

12. The apparatus according to claim 6, wherein one or both of the clamp attachment means comprises a retractable, spring-loaded, rotating-cam plunger that engages one of the rack sides through a plunger hole in one of the clamp arms.

13. The apparatus according to claim 7, wherein the rack base further comprises a rack attachment means by which the reel rack is vertically or horizontally secured to a supporting structure.

14. The apparatus according to claim 8, wherein the rack base further comprises a rack attachment means by which the reel rack is vertically or horizontally secured to a supporting structure.

15. The apparatus according to claim 9, wherein the rack base further comprises a rack attachment means by which the reel rack is vertically or horizontally secured to a supporting structure.

16. The apparatus according to claim 10, wherein the rack base further comprises a rack attachment means by which the reel rack is vertically or horizontally secured to a supporting structure.

17. The apparatus according to claim 11, wherein the rack base further comprises a rack attachment means by which the reel rack is vertically or horizontally secured to a supporting structure.

18. The apparatus according to claim 12, wherein the rack base further comprises a rack attachment means by which the reel rack is vertically or horizontally secured to a supporting structure.

19. The apparatus according to claim 13, wherein the rack attachment means comprises one or more countersunk screws inserted through cooperating screw apertures in the rack base.

20. The apparatus according to claim 14, wherein the rack attachment means comprises one or more countersunk screws inserted through cooperating screw apertures in the rack base.

21. The apparatus according to claim 15, wherein the rack attachment means comprises one or more countersunk screws inserted through cooperating screw apertures in the rack base.

22. The apparatus according to claim 16, wherein the rack attachment means comprises one or more countersunk screws inserted through cooperating screw apertures in the rack base.

23. The apparatus according to claim 17, wherein the rack attachment means comprises one or more countersunk screws inserted through cooperating screw apertures in the rack base.

24. The apparatus according to claim 18, wherein the rack attachment means comprises one or more countersunk screws inserted through cooperating screw apertures in the rack base.

25. The apparatus according to claim 19, wherein two reel racks are longitudinally interconnected across two adjacent ends of the reel racks by a rack bridge passing through the rack channels.

26. The apparatus according to claim 20, wherein two reel racks are longitudinally interconnected across two adjacent ends of the reel racks by a rack bridge passing through the rack channels.

27. The apparatus according to claim 21, wherein two reel racks are longitudinally interconnected across two adjacent ends of the reel racks by a rack bridge passing through the rack channels.

28. The apparatus according to claim 22, wherein two reel racks are longitudinally interconnected across two adjacent ends of the reel racks by a rack bridge passing through the rack channels.

29. The apparatus according to claim 23, wherein two reel racks are longitudinally interconnected across two adjacent ends of the reel racks by a rack bridge passing through the rack channels.

30. The apparatus according to claim 24, wherein two reel racks are longitudinally interconnected across two adjacent ends of the reel racks by a rack bridge passing through the rack channels.

* * * * *